(12) United States Patent
Sawarkar et al.

(10) Patent No.: US 8,638,136 B2
(45) Date of Patent: Jan. 28, 2014

(54) START-UP SYSTEM AND METHOD FOR SWITCHING VOLTAGE REGULATOR

(75) Inventors: Prasad Sawarkar, Bangalore (IN); Srinivas Reddy Chokka, Bangalore (IN)

(73) Assignee: LSI Corporation, San Jose, CA (US)

( * ) Notice: Subject to any disclaimer, the term of this patent is extended or adjusted under 35 U.S.C. 154(b) by 522 days.

(21) Appl. No.: 12/979,705

(22) Filed: Dec. 28, 2010

(65) Prior Publication Data

US 2012/0161825 A1    Jun. 28, 2012

(51) Int. Cl.
*H03L 7/00*   (2006.01)
(52) U.S. Cl.
USPC .......................................................... 327/143
(58) Field of Classification Search
USPC ............................................ 323/283; 327/143
See application file for complete search history.

(56) References Cited

U.S. PATENT DOCUMENTS

| 4,524,412 A | 6/1985 | Eng |
| 2007/0145957 A1 | 6/2007 | Wu et al. |
| 2009/0303641 A1* | 12/2009 | Abe ................................ 361/18 |

* cited by examiner

*Primary Examiner* — Daniel Rojas
(74) *Attorney, Agent, or Firm* — Kermit D. Lopez; Luis M. Ortiz; Ortiz & Lopez, PLLC

(57) ABSTRACT

A switching voltage regulator system and method for providing a start-up mode. An on-chip voltage regulator can be integrated with an on-chip digital logic circuit to provide a core supply voltage to the on-chip digital logic circuit along with an off-chip inductor and capacitor. A clock less start-up circuit automatically operates the on-chip voltage regulator in a start-up mode in order to maintain an equilibrium voltage supply with respect to the on-chip digital logic circuit. Such clock less start-up circuit provides soft start-up operation with respect to the on-chip voltage regulator without a clock signal.

16 Claims, 3 Drawing Sheets

START-UP SYSTEM AND METHOD FOR SWITCHING VOLTAGE REGULATOR

TECHNICAL FIELD

Embodiments are generally related to digital circuits. Embodiments are also related to voltage regulators. Embodiments are additionally related to systems and methods for providing a start-up mode with respect to a switching voltage regulator.

BACKGROUND OF THE INVENTION

On-chip voltage regulators are switching voltage regulators employed for regulating and controlling a voltage supply of digital logic circuit such as, for example, a microcontroller, a microprocessor and a microcomputer. Such on-chip voltage regulator circuits typically convert an unregulated input voltage into a regulated output voltage of a predetermined value determined by a reference voltage to the regulator. Upon applying the input voltage to the switching voltage regulator, there is inrush of current which may damage the power devices, inductor and capacitor employed in switching voltage regulator. Start-up circuits can be employed in such switching voltage regulators to ramp the output voltage from zero value to a predetermined value without causing the current exceeding the maximum limit.

Most prior art start-up circuits with respect to the switching voltage regulators employ an input/output (I/O, package pin) pin and a fixed frequency clock for performing the start-up. Such input/output (I/O) pin can be employed to slowly ramp the reference voltage to the switching voltage regulator from zero value to a predetermined value. The switching voltage regulator compares this slow ramping reference to its output voltage every fixed frequency clock. By virtue of this mechanism, the output voltage is ramped to its predetermined value without current exceeding the maximum limit.

Based on the foregoing, it is believed that a need exist for an improved start-up system and method for switching voltage regulators without the input/output (I/O) pin and clock for startup, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved switching voltage regulator system and method.

It is another aspect of the disclosed embodiments to provide for an improved start-up circuit for providing a start-up mode.

The aforementioned aspects and other objectives and advantages can now be achieved as described herein. A switching voltage regulator system and method for providing a start-up mode is disclosed herein. An on-chip voltage regulator can be integrated with an on-chip digital logic circuit to provide a core supply voltage to the on-chip digital logic circuit along with an off-chip inductor and capacitor. A clock less start-up circuit automatically operates the on-chip voltage regulator in a start-up mode in order to maintain an equilibrium voltage supply with respect to the on-chip digital logic circuit. Such clock less start-up circuit provides soft start-up operation with respect to the on-chip voltage regulator without a clock signal.

On-chip POR (Power On Reset) circuit toggles from low to high when the input supply to the switching voltage regulator has crossed a certain threshold. A first flip-flop circuit and a second flip-flop circuit of the start-up circuit are in a RESET state until POR circuit toggles in order to ensure that a first gate signal (PGATE) controlling the gate of a p-channel transistor switch (P-MOSFET switch) and a second gate signal (NGATE) controlling the gate of a n-channel transistor switch (N-MOSFET switch) are high and low respectively causing regulator output to be in a high impedance state.

Once POR circuit toggles, a first gate signal (PGATE) controlling the gate of a p-channel transistor switch (P-MOSFET switch) goes low as output voltage $V_{out}$ is less than a reference voltage $V_{ref}$. A reference comparator measures the reference voltage $V_{ref}$ with respect to the start-up circuit. As a first gate signal (PGATE) controlling the gate of a p-channel transistor switch (P-MOSFET switch) goes low, this causes second flip-flop circuit to SET there by releasing the RESET state of the first flip-flop circuit. As a first gate signal (PGATE) controlling the gate of a p-channel transistor switch (P-MOSFET switch) is low, p-channel transistor switch (P-MOSFET switch) is turned ON. Upon this, the current through off-chip inductor starts ramping up.

A current sensing circuit provides the measure of the amount of current flowing through off chip inductor. A peak comparator compares the output of current sensing circuit against a predetermined peak voltage $V_{peak}$. As current through off chip inductor reaches predetermined peak voltage $V_{peak}$, the comparator output toggles from low to high. This causes first flip-flop circuit to SET, eventually a first gate signal (PGATE) controlling the gate of a p-channel transistor switch (P-MOSFET switch) and a second gate signal (NGATE) controlling the gate of a n-channel transistor switch (N-MOSFET switch) go high. This way p-channel transistor switch (P-MOSFET switch) turns off and n-channel transistor switch (N-MOSFET switch) turns ON. Upon this, the current through off-chip inductor starts ramping down.

A zero crossing comparator toggles from low to high when the current through the off chip inductor reaches zero. This causes second flip-flop circuit to RESET, there by making a second gate signal (NGATE) controlling the gate of a n-channel transistor switch (N-MOSFET switch) low. This turns OFF n-channel transistor switch (N-MOSFET switch). As the second flip-flop circuit is RESET, the first flip-flop circuit is also in RESET state, once again making a first gate signal (PGATE) controlling the gate of a p-channel switch to go low. This eventually turns ON p-channel transistor switch (P-MOSFET switch) and the current through off chip inductor starts ramping up again. For every turn ON and turn OFF of p-channel transistor switch (P-MOSFET switch) and n-channel transistor switch (N-MOSFET switch), the output voltage of the regulator increases. This operation repeats until output voltage $V_{out}$ of regulator has reached reference voltage $V_{ref}$ making sure the output voltage has reached reference voltage without current through off chip inductor exceeding maximum limit in a clock less start-up.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
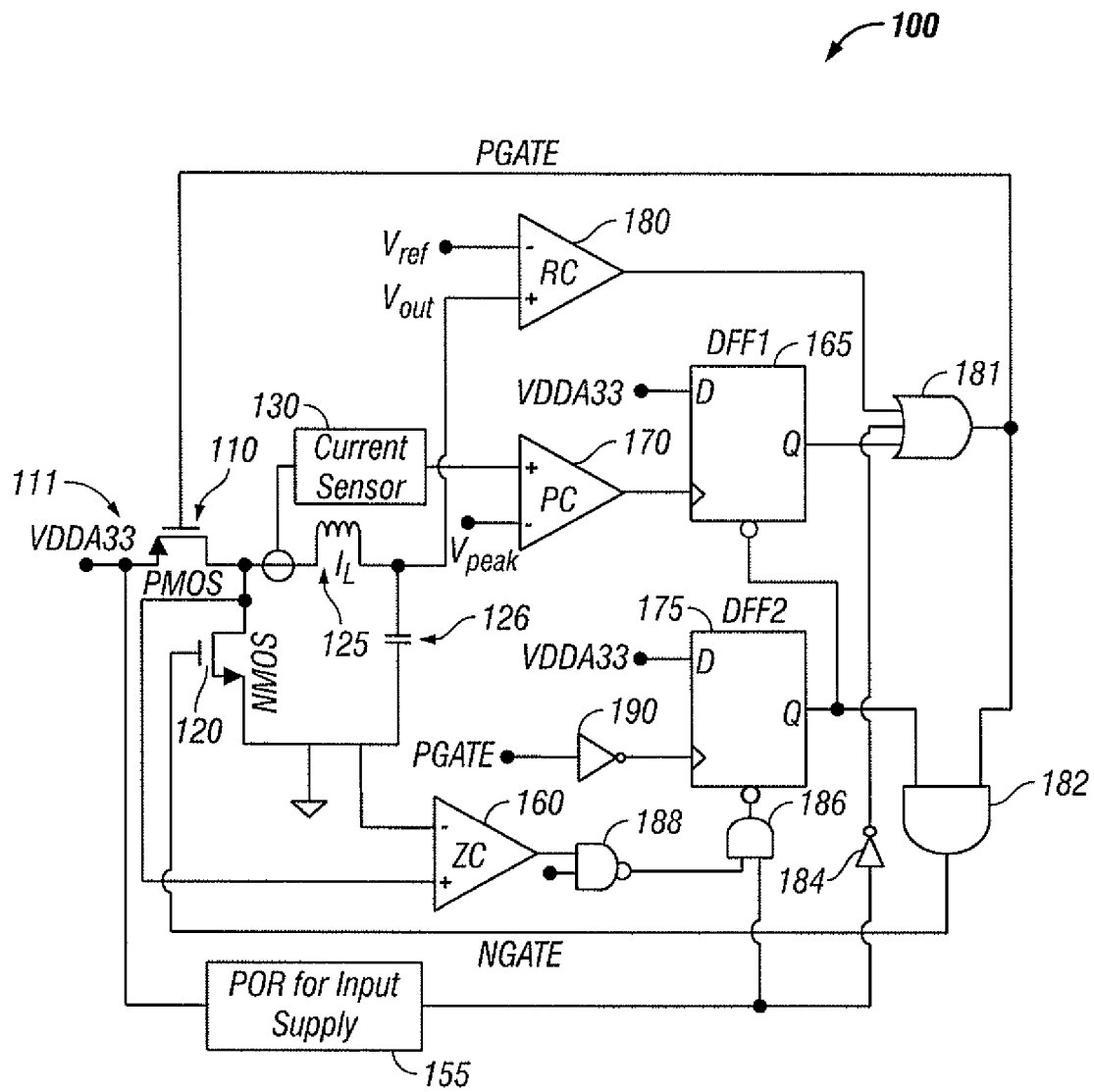
FIG. 1 illustrates a circuit diagram of a switching voltage regulator with a clock less start-up circuit, in accordance with the disclosed embodiments.

FIG. 1 illustrates a circuit diagram of a clock less start-up circuit 100 for a switching voltage regulator, in accordance with the disclosed embodiments. The start-up circuit 100 generally includes an off-chip inductor 125, an off-chip capacitor 126 and one or more on-chip circuits, such as, for example, on-chip POR circuit 155, as depicted in FIG. 1. The on-chip POR circuit 155 connects electrically to an input supply 111, which in turn is connected electrically to a p-channel transistor switch 110.

The start-up circuit 100 further includes a first flip-flop circuit 165 and a second flip-flop circuit 175. Additionally, the start-up circuit 100 includes a zero crossing comparator 160, along with a peak comparator 170 and a reference comparator 180 having inputs labeled as VREF and VOUT. The zero crossing comparator 160 provides an output that is provided as input to the NAND gate 188. A negative input to the zero crossing comparator 160 is connected to ground and also to the off-chip capacitor 126 and an n-channel transistor switch 120.

A positive input to the zero crossing comparator 160 is connected electrically to the p-channel transistor switch 110, the current sensing circuit 130 and the off-chip inductor 125. The peak comparator 170 includes an input VPEAK and an input that is provided as output from a current sensing circuit 130, which is also connected to the off-chip inductor 125. The output from the reference comparator 180 is supplied as input to an OR Gate 181 along with input from an inverter 184 (e.g., a NOT Gate). The start-up circuit 100 also includes an AND Gate 182 having at least one input fed from the output of the OR Gate 181 and a signal from the second flip-flop circuit 175. The second flip-flip-circuit 175 can be connected electrically to the first flip-flop circuit 165. Note that the NAND gate 188 can be in turn connected to the AND gate 186, which in turn can be connected electrically to the second flip-flop circuit 175. An inverter 190 (e.g., a NOT Gate) can be also connected electrically to the second flip-fop circuit 175.

In general, the on-chip POR circuit 155 can toggle from low to high when the input supply 111 to the switching voltage regulator has crossed a particular threshold. Until the on-chip POR circuit 155 toggles, the first flip-flop circuit 165 and the second flip-flop circuit 175 of the start-up circuit 100 are in a RESET state. This ensures that a first gate signal (PGATE) controlling the gate of the p-channel transistor switch 110 and a second gate signal (NGATE) controlling the gate of a n-channel transistor switch 120 are high and low respectively causing regulator output to be in high impedance state. Note that the p-channel transistor switch 110 is a p-channel metal-oxide-semiconductor field-effect transistor (P-MOSFET) switch and the n-channel transistor switch 120 is an n-channel metal-oxide-semiconductor field-effect transistor (N-MOSFET) switch.

Once the on-chip POR circuit 155 toggles, a first gate signal (PGATE) controlling the gate of a p-channel transistor switch 110 (P-MOSFET switch) goes low as output voltage $V_{out}$ is less than a Reference voltage $V_{ref}$. A reference comparator 180 measures the Reference voltage $V_{ref}$ with respect to the start-up circuit 100. As a first gate signal (PGATE) controlling the gate of a p-channel transistor switch 110 (P-MOSFET switch) goes low, this causes second flip-flop circuit 175 to SET there by releasing the RESET state of first flip-flop circuit 165. As a first gate signal (PGATE) controlling the gate of a p-channel transistor switch 110 (P-MOSFET switch) is low, p-channel transistor switch 110 (P-MOSFET switch) is turned ON. Upon this, the current through off-chip inductor 125 starts ramping up.

The current sensing circuit 130 can provide a measurement of the amount of current flowing through off-chip inductor 125. A peak comparator 170 compares the output of current sensing circuit 130 against a predetermined peak voltage $V_{peak}$. As current through off chip inductor 125 reaches predetermined peak voltage $V_{peak}$, the comparator 170 output toggles from low to high. This causes first flip-flop circuit 165 to SET, eventually a first gate signal (PGATE) controlling the gate of a p-channel transistor switch 110 (P-MOSFET switch) and a second gate signal (NGATE) controlling the gate of a n-channel transistor switch 120 (N-MOSFET switch) go high. This way p-channel transistor switch 110 (P-MOSFET switch) turns off and n-channel transistor switch 120 (N-MOSFET switch) turns ON. Upon this, the current through off-chip inductor 125 starts ramping down.

The zero crossing comparator 160 toggles from low to high when the current through the off chip inductor 125 reaches zero. This causes second flip-flop circuit 175 to RESET, thereby making a second gate signal (NGATE) controlling the gate of an n-channel transistor switch 120 (N-MOSFET switch) low. This turns OFF n-channel transistor switch 120 (N-MOSFET switch). As the second flip-flop circuit 175 is RESET, the first flip-flop circuit 165 is also in RESET state, once again making a first gate signal (PGATE) controlling the gate of a p-channel switch 110 to go low. This eventually turns ON p-channel transistor switch 110 (P-MOSFET switch) and the current through off chip inductor 125 starts ramping up again. For every turn ON and turn OFF of p-channel transistor switch 110 (P-MOSFET switch) and n-channel transistor switch 120 (N-MOSFET switch), the output voltage of the regulator increases. This operation repeats until output voltage $V_{out}$ of regulator has reached Reference voltage $V_{ref}$ making sure the output voltage has reached Reference voltage without current through off chip inductor 125 exceeding maximum limit in a clock less start-up.

Based on the foregoing, it can be appreciated that an on-chip switching voltage regulator can be utilized to generate the core power supply required for on-chip digital logic. The on-chip clock generator circuit works out of the core power supply. So, unless the switching voltage regulator generates the core supply, the clock is not available. In this scenario, the switching voltage regulator has to start without a clock. This is not the case for commercially available switching regulators where the clock will be available or supplied. Thus, the solution disclosed herein involves a circuit technique, which will start the regulator without a clock and still maintain the soft start operation. By "soft start", we mean that the inductor current is not allowed to shoot beyond the peak current specification.

A switching voltage regulator typically includes a current comparator, a current reversal comparator and a reference comparator. The peak current comparator toggles when the inductor current increases beyond the set peak threshold. The current reversal comparator toggles when the inductor current reaches zero. The reference comparator toggles when the output voltage of regulator has increased above the Reference voltage.

The start-up circuit 100 shown in FIG. 1 thus includes digital logic, which utilizes control signals coming from peak and current reversal comparator to generate the PMOS/NMOS Gate signals namely PGATE and NGATE. In a clocked scenario, for example, the PGATE and NGATE can be generated based on a clock circuit.

Note that in some situations, the switching voltage regulator runs out of a 3.3 v supply, for example, and the on-chip 3.3 v POR circuit (e.g., POR circuit 155) toggles once the 3.3 v supply has reached threshold. Additionally, based on the foregoing, it can be appreciated that all D-Flop Flops shown in FIG. 1 are in reset state and the PGATE and NGATE signals are high and low respectively to make sure that regulator output is in high impedance until on-chip 3.3 v POR triggers from low to high.

Once the POR circuit 155 toggles, the PGATE controlling the gate of PMOS switch goes low as Vout (regulator output) is less than Vref (reference for regulator). Since PGATE=0, a non-overlapping circuit (not shown in FIG. 1) will make NGATE low. As the PGATE transitions to 0, this causes DFF2 to SET, hence releasing the RESET of DFF1. With PGATE=0, PMOS switch is ON, so inductor current starts ramping. As sensed inductor current reaches a predetermined peak (set by Vpeak), the peak comparator toggles from low to high. This SETs DFF1, which makes PGATE and NGATE high. This causes PMOS to turn-off and NMOS to turn-on. So inductor current starts ramping down. As inductor current reaches 0, the current reversal comparator triggers from low to high causing DFF2 to RESET, thus turning OFF NMOS. This RESETs DFF1, once again making PGATE to go low and PMOS turns ON. This way the cycle repeats until VOUT reaches VREF making sure the output has reached VREF without inductor current shoot in a clock less scenario.

Figure 2:
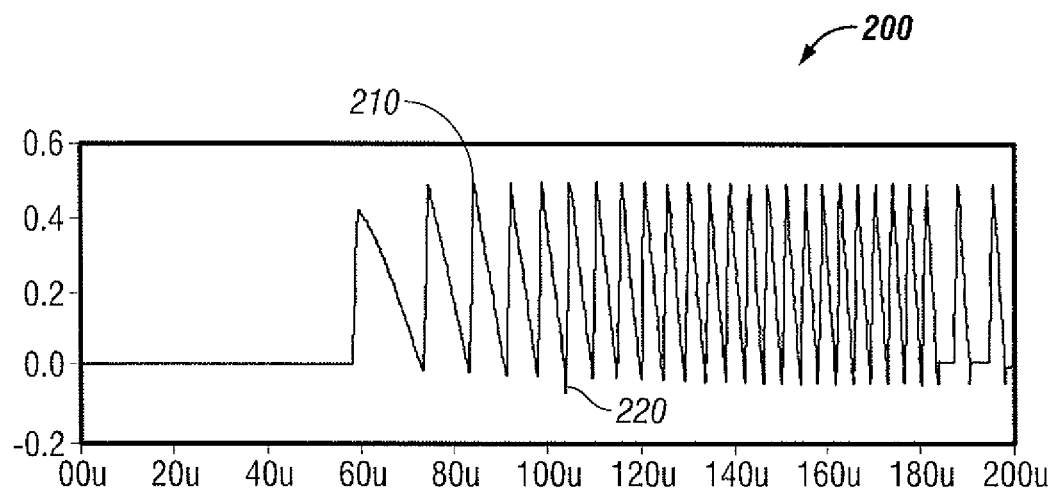
FIG. 2 illustrates a graph representing an inductor current flow of an off-chip inductor, in accordance with the disclosed embodiments.

FIG. 2 illustrates a graph 200 depicting an inductor current waveform (IL), in accordance with the disclosed embodiments. In general, the off-chip inductor 125 of the start-up circuit 100 of switching voltage regulator can be a passive electrical component that can store energy in a magnetic field created by the electric field passing through inductor 125. The off-chip inductor 125 can be a conducting wire shaped coil with one or more loops for creating a strong magnetic field inside the coil due to Ampere's Law. Due to the time-varying magnetic field inside the coil, a voltage $V_{out}$ is induced, according to Faraday's law of electromagnetic induction, which by Lenz's Law opposes the change in current that created it. The region 210 represents peak current in the off-chip inductor 125. The region 220 represents the zero current flow in the off-chip inductor 125.

Figure 3:
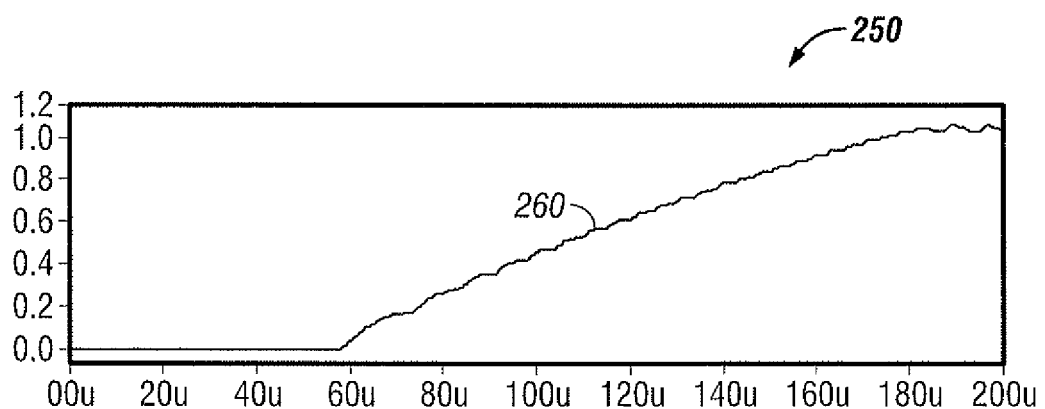
FIG. 3 illustrates a graph representing the regulator output voltage flow, in accordance with the disclosed embodiments.

FIG. 3 illustrates a graph 250 representing the switching voltage regulator output voltage flow, in accordance with the disclosed embodiments. The line 260 represents the output voltage $V_{out}$ with respect to the digital logic circuit in presence of the off-chip inductor 125.

Figure 4:
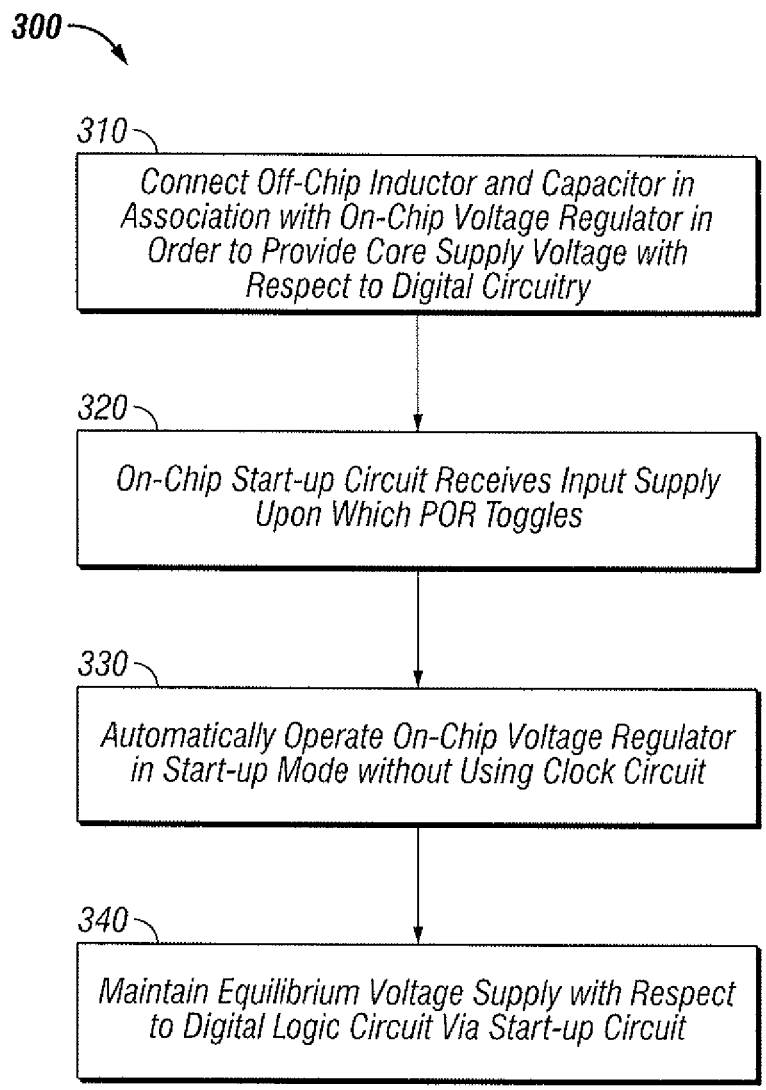
FIG. 4 illustrates a high level flow chart of operations illustrating logical operational steps of a method for providing a start-up mode with respect to the switching voltage regulator, in accordance with the disclosed embodiments.

FIG. 4 illustrates a high level flow chart of operations illustrating logical operational steps of a method 300 for providing start-up mode with respect to the switching voltage regulator start-up circuit 100, in accordance with the disclosed embodiments. The on-chip start-up circuit 100 can be connected in association with the off-chip inductor 125 and the off-chip capacitor 126 in order to provide the core supply voltage with respect to the on-chip digital logic circuit, as illustrated at block 310. That is, the operation depicted at block 310 involves a step to connect the off-chip inductor and capacitor in association with the on-chip voltage regulator to provide the core supply voltage with respect to digital circuitry. The on-chip start-up circuit 100 receives input supply upon which POR circuit 155 toggles, as depicted at block 320.

The on-chip start-up circuit 100 operates in the start-up mode without using a clock signal, as illustrated at block 330. The start-up circuit 100 maintains the equilibrium voltage supply with respect to the digital circuit, as indicated at block 340.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A switching voltage regulator start-up system, comprising:
    an on-chip voltage regulator integrated with an on-chip digital logic circuit, said on-chip voltage regulator associated with an off-chip inductor and a capacitor to provide a core supply voltage with respect to said on-chip digital logic circuit;
    a clock less start-up circuit that automatically operates said on-chip voltage regulator in a start-up mode in order to maintain an equilibrium voltage supply with respect to said on-chip digital logic circuit, wherein said clock less start-up circuit provides a soft start-up operation with respect to said on-chip voltage regulator without a clock signal;
    a first flip-flop circuit and a second flip-flop circuit of operates in a RESET state until said power-on-reset circuit toggles; and
    a first gate signal controlling a gate of a p-channel transistor switch and a second gate signal controlling a gate of a n-channel transistor switch are high and low respective causing said regulator output to be in a high impedance state.

2. The system of claim 1 further comprising an on-chip power-on-reset circuit that toggles from low to high when an input supply to said switching voltage regulator has crossed a certain threshold.

3. The system of claim 1 further comprising a reference comparator for measuring a reference voltage with respect to said start-up circuit.

4. The system of claim 1 wherein said first gate signal controlling said gate of said p-channel transistor switch turns ON so that current through said off-chip inductor ramps upward as an output voltage is less than a reference voltage, once said power-on-reset circuit toggles.

5. The system of claim 1 further comprising a current sensing circuit that measures an amount of current through said off chip inductor.

6. The system of claim 1 further comprising a zero crossing comparator toggles from low to high when a current through said off chip inductor attains a zero value.

7. The system of claim 6 wherein said second flip-flop circuit is RESET and said first gate signal and said second gate signal transitions into a low state so that said n-channel transistor switch turns OFF and said p-channel transistor switch turns ON and current through said off chip inductor begins to ramp upward again.

8. The system of claim 1 wherein said p-channel transistor switch and said n-channel transistor switch turn ON and turn OFF so that said output voltage of said regulator increases until said output voltage of said regulator attains said reference voltage without current through said off chip inductor exceeding maximum limit in said dock less start-up.

9. A switching voltage regulator start-up system, comprising:
an on-chip voltage regulator integrated with an on-chip digital logic circuit, said on-chip voltage regulator associated with an off-chip inductor and a capacitor to provide a core supply voltage with respect to said on-chip digital logic circuit;
a clock less start-up circuit that automatically operates said on-chip voltage regulator in a start-up mode in order to maintain an equilibrium voltage supply with respect to said on-chip digital logic circuit, wherein said clock less start-up circuit provides a soft start-up operation with respect to said on-chip voltage regulator without a clock signal;
a peak comparator for comparing an output of a current sensing circuit against a predetermined peak voltage wherein said peak comparator output toggles from a low state to a high state as current through said off chip inductor attains a predetermined peak voltage; and
wherein said first flip-flop circuit is SET and said first gate signal and said second gate signal transition into a high state so that said p-channel transistor switch turns OFF and said n-channel transistor switch turns ON and the current through said off-chip inductor begins to ramp downward.

10. A switching voltage regulator start-up method, said method comprising:
integrating an on-chip voltage regulator with an on-chip digital logic circuit;
associating said on-chip voltage regulator with an off-chip inductor and a capacitor to provide a core supply voltage with respect to said on-chip digital logic circuit; and
providing a clock less start-up circuit that automatically operates said on-chip voltage regulator in a start-up mode in order to maintain an equilibrium voltage supply with respect to said on-chip digital logic circuit, wherein said clock less start-up circuit provides a soft start-up operation with respect to said on-chip voltage regulator without a clock signal; and
providing an on-chip power-on-reset circuit that toggles from low to high when an input supply to said switching voltage regulator has crossed a certain threshold.

11. The method of claim 10 further comprising:
providing a first flip-flop circuit and a second flip-flop circuit of operates in a RESET state until said power-on-reset circuit toggles; and
configuring a first gate signal to control a gate of a p-channel transistor switch in a high state and a second gate signal to control a gate of a n-channel transistor in a low state respectively to cause said regulator output to be in a high impedance state.

12. The method of claim 10 further comprising measuring a reference voltage with respect to said start-up circuit via a reference comparator.

13. The method of claim 10 further comprising measuring an amount of current through said off chip inductor via a current sensing circuit.

14. The method of claim 10 further comprising comparing, via a peak comparator, an output of said current sensing circuit against a predetermined peak voltage wherein said peak comparator output toggles from a low state to a high state as current through said off chip inductor attains a predetermined peak voltage.

15. The method of claim 10 further comprising providing a zero crossing comparator that toggles from low to high when a current through said off chip inductor attains a zero value.

16. The method of claim 11 wherein:
said second flip-flop circuit is RESET and said first gate signal and said second gate signal transitions into a low state so that said n-channel transistor switch turns OFF and said p-channel transistor switch turns ON and current through said off chip inductor begins to ramp upward again; and
wherein said p-channel transistor switch and said n-channel transistor switch turn ON and turn OFF so that said output voltage of said regulator increases until said output voltage of said regulator attains said reference voltage without current through said off chip inductor exceeding maximum limit in said clock less start-up.

* * * * *